United States Patent [19]

Isobe

[11] 4,340,280
[45] Jul. 20, 1982

[54] DRIVE CONNECTION MECHANISM FOR ADJUSTABLE LENS SYSTEM

[75] Inventor: Takashi Isobe, Tokyo, Japan

[73] Assignee: Canon Kabushiki Kaisha, Tokyo, Japan

[21] Appl. No.: 131,194

[22] Filed: Mar. 17, 1980

[30] Foreign Application Priority Data

Mar. 24, 1979 [JP] Japan .................. 54-38148[U]

[51] Int. Cl.³ .................... G02B 7/04; G02B 7/10
[52] U.S. Cl. .................... 350/429; 350/255
[58] Field of Search ............ 350/247, 255, 427–430, 350/114–116, 255, 429; 354/195, 197–198, 286; 352/140; 353/76, 101

[56] References Cited

U.S. PATENT DOCUMENTS

| | | | |
|---|---|---|---|
| 1,806,422 | 5/1931 | Shaen | 350/116 |
| 2,514,239 | 7/1950 | Hopkins | 350/425 |
| 2,537,561 | 1/1951 | Waitt | 350/429 |
| 2,566,485 | 9/1951 | Cuvillier | 350/429 |
| 3,465,662 | 9/1969 | Kashiwase | 354/198 |

FOREIGN PATENT DOCUMENTS 54-98616  8/1979  Japan .................. 354/195

*Primary Examiner*—William H. Punter
*Attorney, Agent, or Firm*—Toren, McGeady & Stanger

[57] ABSTRACT

A drive connection mechanism for a mounting assembly of a lens system including a relatively stationary lens barrel, a lens holder member movably fitted radially inwardly of said lens barrel and an actuator member movably fitted radially outwardly of said lens barrel. A drive connection device is provided between the actuator member and the lens holding member to effect an axial drive connection therebetween whereby the actuator member may be manipulated to move the lens holder member axially of the lens barrel while preserving the normal attitude of the lens optical system relative to the common optical axis of the lens system during the entire excursion thereof.

5 Claims, 5 Drawing Figures

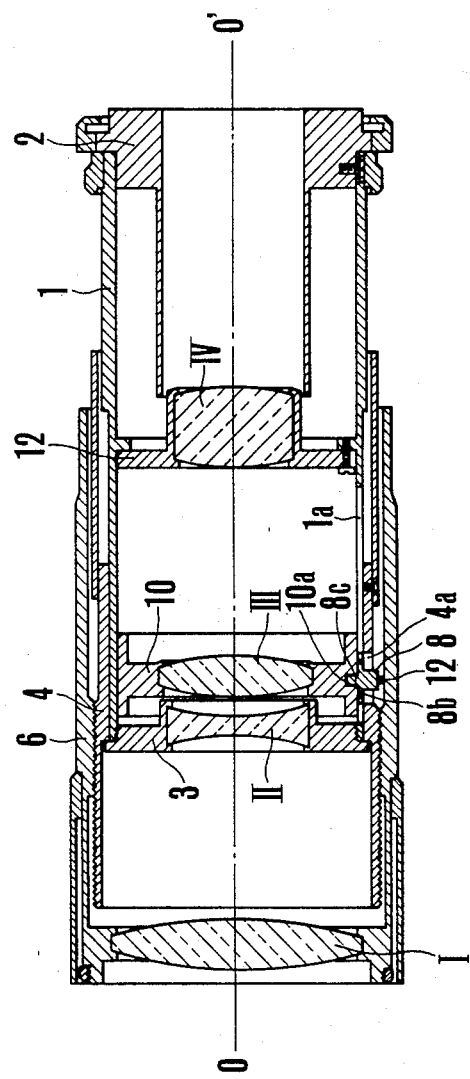

DRIVE CONNECTION MECHANISM FOR ADJUSTABLE LENS SYSTEM

BACKGROUND OF THE INVENTION

The present invention relates generally to photographic equipment and more particularly to a mechanical mounting assembly for a lens system of such equipment. The invention is more specifically directed toward a drive connection mechanism for a movable lens holder member in the assembly.

In the design of a mounting mechanism for a lens holder member which must be axially moved by operation of an actuator member in the lens system, the provision of drive connection means between the lens holder member and the actuator member may give rise to a variety of operational problems.

One such problem arises due to the fact that mechanical complexity of such a system may give rise to increased production costs. It has been common practice in the art to drivingly connect the actuator member to the lens holding member through a key member which is engaged in a key slot of the stationary tube or barrel of the lens system with these members being fixedly secured to each other by the utilization of screw fasteners or the like. For this reason, the number of parts of the assembly is increased and the machining and assembly steps required are also increased. This necessarily gives rise to difficulty in achieving reduction in the costs of such an assembly.

An additional problem which arises relates to the difficulty of insuring stability of the movable lens during its entire excursion so that the lens itself will be held precisely in position normal to the axis of the lens system. In a lens assembly where the overall length which must be traveled by the lens holding member and the lens along the inner diameter of the barrel is sufficiently long, there occurs less difficulty with regard to the influence of accidental tilting of the movable lens with respect to the optical axis and relative to other lenses in the system to insure appropriate optical performance of the system. However, in a more compact lens assembly, it has been difficult to provide positional stability of the lens holding member through a sufficient length of engagement during operation of the lens system.

This difficulty becomes more pronounced when the actuator member, the lens holding member and the drive connection member such as the key member are assembled in a fixed and secured relationship relative to each other by utilization of fastening members.

Accordingly, the present invention is primarily directed toward the provision of a mechanism for connecting an actuator member through a stationary lens barrel in driving engagement with a lens holder member or sleeve which is fitted on the inner diameter of the lens barrel.

The invention is also directed toward provision of a drive connection mechanism of the character described wherein the number of constituent parts is reduced thereby contributing to easier production techniques and to decrease in the production costs of the system.

Furthermore, the invention is directed toward provision of an adjustable mounting system for holding the movable lens sleeve within a lens optical system so that the lens may be adjustably confined to the optical axis over its entire excursion within the lens mounting assembly.

Another aim of the invention is the provision of a drive connection mechanism for an adjustable mounting system of the type described which will enable adjustable operation of the optical system while avoiding tilting of the lens with reduced effort and difficulty.

A further goal of the invention is to provide a lens assembly mounting and driving system wherein parts may be made of synthetic resin material by molding techniques thereby contributing to reduction in the costs of manufacture while nevertheless providing for a lens optical system which will assure high levels of performance.

SUMMARY OF THE INVENTION

Briefly, the present invention may be described as a mounting assembly for a lens system comprising a lens barrel member defining an axis and including guide means, a lens holder member having a lens fixedly supported thereon, an actuator member for moving the lens axially of the lens barrel, with the lens holder member and the actuator member being mounted for axial movement relative to the lens barrel on radially opposite sides of the barrel, and a drive connection or dowel member for connecting the lens holder member in driving engagement with the actuator member, the drive connection member including a fixing portion for affixation of the connection member with the actuator member, a first contact portion in sliding engagement with the guide means of the lens barrel and an engagement portion arranged upon engagement with the holder member to connect the holder member and the actuator member for movement in unison relative to the lens barrel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 5 is an axial sectional view of the mounting assembly of FIG. 1 shown in a different operative position of the actuator member.

DETAILED DESCRIPTION OF THE PREFERRED EMBODIMENTS

Figure 1:
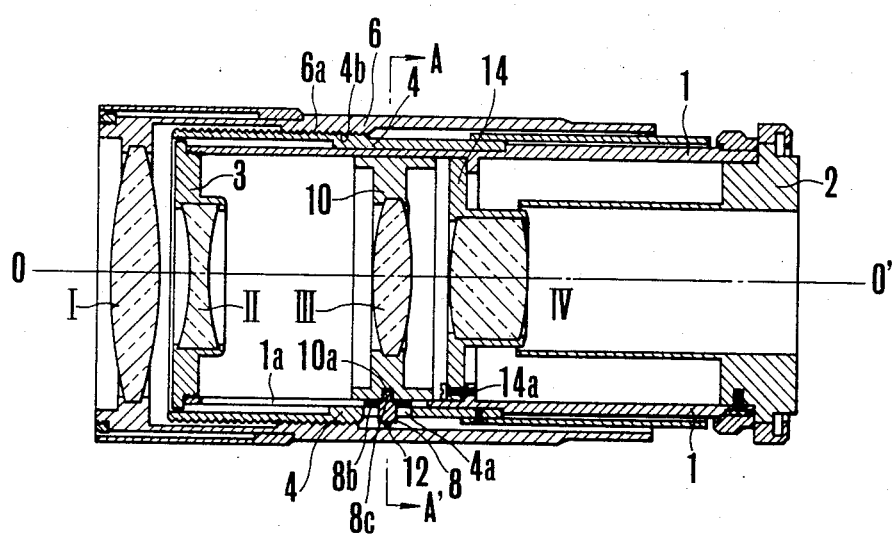
FIG. 1 is an axial sectional view of a mechanical mounting assembly for a zoom lens utilizing one form of the drive connection of the invention.
Figure 2:
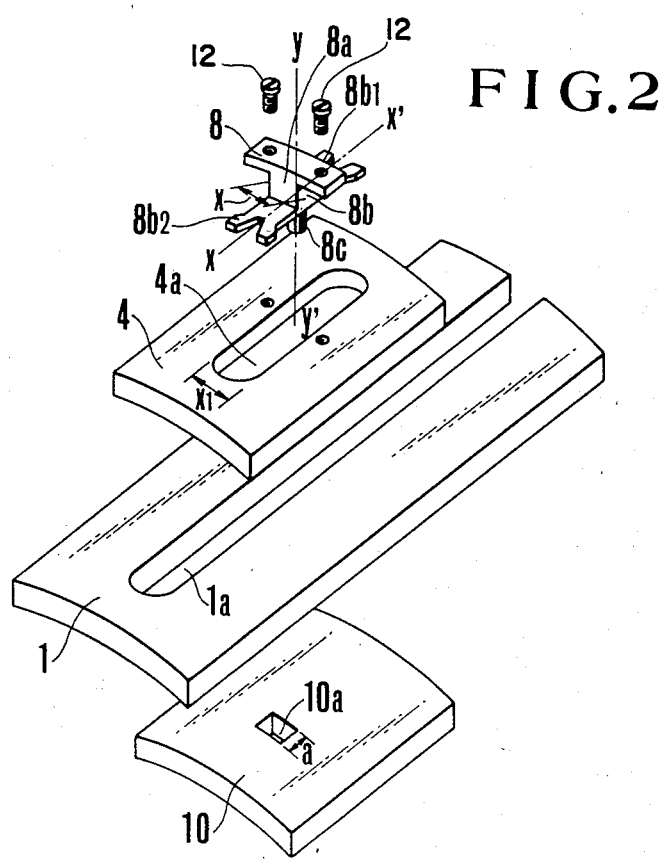
FIG. 2 is a fragmentary exploded perspective view depicting the principal parts of the drive connection of the invention.

Although the present invention is basically applicable for use with lens mechanisms for various types of lens systems, for example in photographic cameras, television cameras and other similar optical instruments, a preferred embodiment of the present invention will be described hereinafter as applied in the lens mounting mechanism of a photographic camera, particularly a zoom lens.

Referring to the drawings, wherein like reference numerals refer to similar parts throughout the various figures thereof, a lens mounting assembly in accordance with the present invention is depicted as including a stationary tube or lens barrel 1 with an adapter member 2 being provided for enabling attachment of the lens assembly to a camera body. A lens holding member 3 is provided for supporting a lens optical system II in operative engagement in the lens barrel 1. An intermediate sleeve 4 is fitted on the outer diameter of the lens barrel 1 and is axially movable thereon.

An actuator member 6 is provided to enable manual adjustment of the lens system for zooming and focusing purposes. The actuator member 6 is provided with a threaded helicoid portion 6a formed on the inner surface thereof and adapted to be brought in threaded engagement with a threaded helicoid portion 4b of the intermediate sleeve 4. A lens optical system I is mounted at the front of the actuator member 6 in operative position to enable focusing of the lens system.

The system includes a lens holder member 10 which is fitted on the inner diameter of the lens barrel 1 and which supports a lens optical system III. The system also includes a holder member 14 for supporting a lens optical system IV in fixedly mounted position within the lens barrel 1.

Drive connection means in the form of a connecting or dowel member 8 is provided for interconnecting the lens holding member 10 and the actuator member 6 in driving engagement through the lens barrel 1. The intermediate sleeve 4 is affixed to the actuator member 6 and is axially movable therewith. The dowel member 8 is constructed with a first contact area 8a which comprises a penetration portion in fitted engagement within an elongated slot 4a formed in the intermediate sleeve 4 and with a second contact area 8b which comprises a slidable contact portion in fitted engagement in a guide slot 1a formed in the lens barrel 1. The dowel member 8 also includes a projection 8c which comprises an engaging portion arranged for engagement in an opening 10a formed in the lens holding member 10.

The first contact area 8a of the member 8 is formed with a width x which is almost equal to the width x1 of the slot 4a of the intermediate sleeve 4 within which the contact area 8a is seated. The tolerance between these dimensions is prescribed such that when they are in engagement no appreciable wobble will be experienced.

The second contact area 8b is formed with a pair of axially extending arms 8b1 and 8b2, the ends of which are widened in a bifurcated formation in order to impart a resilient property thereto so that when the arms 8b1 and 8b2 are axially moved in fitted engagement within the guide slot 1a, the resiliency of the arms cooperates with a frictional force developed against the sidewalls of the slot 1a to act as a sliding resistance to movement within the slot.

The second contact area 8b is formed so as to define recesses along the portions thereof other than the portions occupied by the arms 8b1 and 8b2. These recesses are formed by decreasing the width of the contact area 8b from the width of the arm portions 8b1 and 8b2. It should be noted here that the provision of the aforementioned arms 8b1 and 8b2 is to form part of the second contact area 8b gives rise to a suitable load on the sliding axial movement of the actuator member which depends upon the resilience of the arms, this resilient action being determined by the finished dimensions of the guide slot 1a.

It should be further noted that the recesses between the arms 8b1 and 8b2 are prerequisite in order for the arms to exert a resilient action so that even when the finished dimensions of the guide slot 1a may deviate from ideal values, an appropriate sliding resistance may nevertheless be developed as a result of the provision of the recesses.

The projection 8c is formed with a circular or oval cross-sectional configuration and it is engaged in the hole 10a of the lens holding member 10. The hole 10a is formed with an axial length a and after the slots 4a, 1a and the hole 10a have been aligned with each other, the dowel member 8 is inserted into the aligned space and the contact areas 8a, 8b and 8c will then be seated in the respective locations. The spatial relationship of the lens optical system III relative to the optical axis o-o' is adjusted by utilization of tools for the assembly. The dowel member 8 is then fixedly secured to the intermediate sleeve by means of screws 12 and the dimensions of the dowel member 8 should fall within the tolerances prescribed with reference to the aforementioned dimensions of the slot. The dimensions of the arms 8b1 and 8b2 taken in the x-x' direction (axial direction) relative to the second contact area taken in the y-y' direction (radial direction) at right angles thereto should fall within certain tolerances.

The projection 8c and the hole 10a in the lens holding member 10 when assembled should be engaged with no play or gap therebetween in the axial direction.

Figure 3:
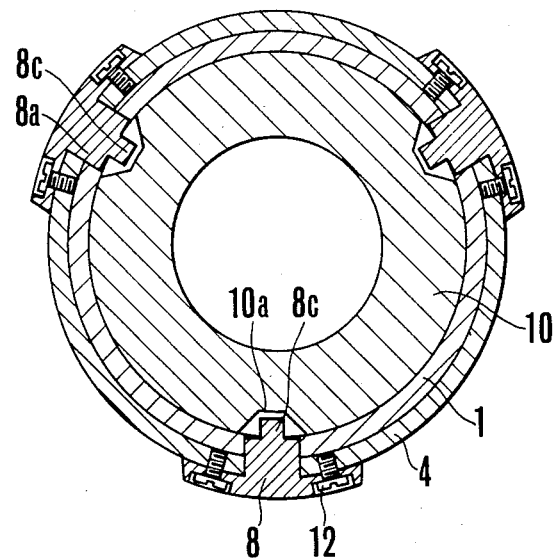
FIG. 3 is a cross-sectional view taken along the line A—A of FIG. 1 depicting an embodiment wherein there is not provided a spacing between the lens barrel and the lens holding member, with the actuator member not shown.

FIG. 3 shows the stationary lens barrel 1 and the lens holding member 10 assembled together without the formation of any spacing or gap therebetween. In the case of this embodiment, the lens holding member 10 is stabilized against tilting relative to the optical axis by the precision of the normal of the y-y' axis of the dowel member 8 at the third contact area to the x-x' axis and the precision of the dimensions of the engaged portion of the third contact area 8c with the wall 10a in the axial directions.

In general, an embodiment of the invention wherein no spacing or gap between the member 10 and the member 1 is provided will exhibit some resistance to sliding movement between the lens holder member 10 and the lens barrel 1 when the dimensions are relatively tight. In the case of an embodiment utilizing a dowel member as the drive connection constructed in the form previously described, stabilization of the engagement of the dowel member in the x-x' direction (axial direction) is achieved by the first and second contact areas 8a and 8b of the dowel member. Further stabilization of the lens holding member 10 fitted in the inner diameter of the lens barrel 1 is achieved by the third contact area in the y-y' direction perpendicular to the x-x' direction so that smooth sliding movement of the lens holding member can be performed.

Figure 4:
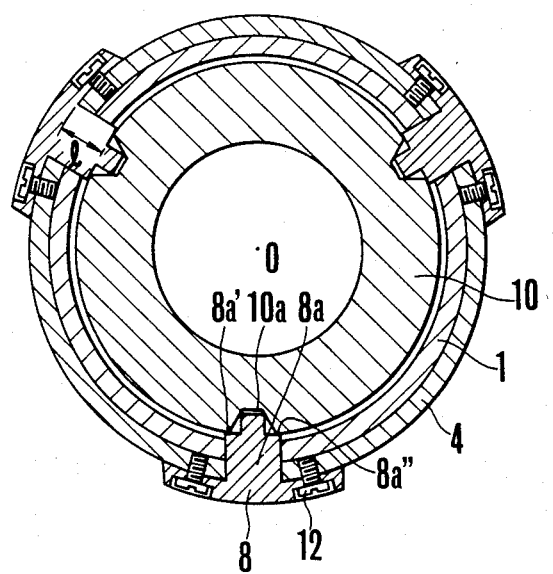
FIG. 4 is a cross-sectional view similar to that of FIG. 3 showing a embodiment wherein a space is provided between the lens barrel and the lens holding member with the actuator member not shown.

FIG. 4 shows another embodiment of the invention wherein a slight spacing is provided between the lens barrel 1 and the lens holder member 10. The provision of this spacing facilitates assembly of the member 10 into the interior of the barrel 1. A further advantage resides in the fact that it is possible to apply an antireflection coating and/or a light-shielding coating to the inner surface of the lens barrel 1 and the outer surface of the lens holder member 10. However, problems may arise in that the lens holder member will tend to assume an eccentric position relative to the optical axis o-o'. In accordance with the present invention this problem is solved by limiting the thickness 1 of the aforementioned first and second contact areas 8a and 8b to a certain predetermined range. More specifically, where the lens barrel 1 and the holder member 10 are required to be separated by a spacing as shown in FIG. 4, adjustment of the thicknesses of the first and second contact areas 8a and 8b of the drive connection member 8 to the valve 1 assures coincidence of the axes of the lens holder member 10 and the barrel 1 with the optical axis. In the case of the ebodiment of FIG. 4, it is desirable to utilize two or three drive connection members 8 arranged in angular spacings of 180° or 120°. A further advantage of the embodiment of FIG. 4 resides in the fact that difficulties which would otherwise result due to frictional engagement between the lens holder member and the lens barrel, such as frictional noise and increased frictional resistance, which might impede convenient and easy use of the lens system, will not be developed. Furthermore, temperature increases will not decrease the ease of relative movement between the parts due to thermal expansion.

In the operation of the mechanical mounting of the zoom lens system constructed in accordance with the present invention, there is shown in FIG. 5 a zooming position where the lens optical systems I and III are moved from the position shown in FIG. 1 by zooming the actuator member 6 along the optical axix o-o'. Since the zooming and focusing operations are performed by a common operating member 6, such axial movement of the actuator member 6 will also cause axial movement of the intermediate sleeve 4 with the key member 8 being driven to move with the forked arm 8b resiliently pressed against the side walls of the elongated slot 1a. The lens holder member 10 will therefore be moved without experiencing wobble in either the radial direction or in directions concentric to the optical axis.

As the first and third lenses I and III are moved axially in response to forward movement of the actuator member 6, the focal length of the entire optical system will be varied in order to effect zooming operation. For focusing purposes, the operator may rotate the actuator member 6 about the optical axis whereby the first lens will be moved relative to the other lenses leaving the intermediate sleeve 4 stationary in position.

As has been previously described, the invention is directed toward providing a mechanical mounting assembly for a lens optical system wherein a lens holder member 10 is fitted on the inner diameter of the lens barrel 1 and is arranged to be movable along an optical axis by operation of an actuation member 6 whereby a drive connection therebetween may comprise an intermediate member 4 affixed to the actuator member 6 and a dowel or drive connection member 8 affixed to the intermediate member and projecting through and outwardly from slots 4a, 1a provided through the walls of the intermediate member and of the lens barrel in order to support the lens holder member 10 in a direction normal to the optical axis.

The dowel member 8 of the present invention is provided with contact portions 8a and 8b which are arranged for engagement with a slotted portion 4a of the intermediate member 4 and with a slotted portion or guide slot 1a of the stationary lens barrel 1. In particular, bifurcated arms 8b1 and 8b2 resiliently engage against the sidewalls of the guide slot 1a of the lens barrel 1 whereby as a result of the resilient force developed there may be imparted a suitably firm sliding engagement in order to prevent the lens holder member from being accidentally tilted. The drive connection mechanism of the present invention may be constructed by utilizing molding techniques from plastic material. The dimensional precision of each of the contact areas may be increased and handling difficulties will to a great extent be reduced since the dowel member may be simply inserted into a slot 4a of the intermediate sleeve 4 with moderate pressure.

It should be noted that although the foregoing embodiment has been described as including a dowel member 8 which is formed with an engagement projection 8c which engages a hole 10a of a lens holder member 10, this arrangement may be reversed. In this case, the lens holder member may be provided with a plurality of outwardly extending projections in radial alignment with respective holes provided in the dowel members 8. Since it is difficult to assembly such a movable lens holder member within the interior of the stationary lens barrel, it is preferred to limit the number of projections to two.

While specific ebodiments of the invention have been shown and described in detail to illustrate the application of the inventive principles, it will be understood that the invention may be embodied otherwise without departing from such principles.

What is claimed is:

1. A mounting assembly for a lens system comprising:
    a lens mounting member having a hole therein;
    a stationary lens barrel having a guide slot therein;
    an actuating member for actuating said lens mounting member;
    an intermediate member having a slot formed therein and being arranged between said stationary lens barrel and said actuating member, said intermediate member being movable together with said actuating member in a direction along the optical axis of said lens system; and
    a plurality of connecting members for connecting said lens mounting member to said intermediate member, each of said connecting members comprising a penetration portion extending through said slot in said intermediate member in a direction toward said lens mounting member fixing said connecting member in said intermediate member, a slidable contact portion having an elastic member fitted into said guide slot of said stationary lens barrel and extending in a direction parallel to the optical axis of said lens system to exert a engaging portion engageable with said hole provided in said lens mounting member;
    each of said connecting members being made entirely of synthetic resin material and arranged equally spaced around the optical axis of said lens system to mount said lens mounting member in said stationary lens barrel.

2. An assembly according to claim 1 wherein said lens system includes a lens assembly mounted on said lens mounting member operating to vary the magnification of an image by movement thereof in a direction along the optical axis of said lens system, said lens mounting member being stabilized with regard to the accuracy of its inclination in the radial direction with respect to said optical axis by said penetration portion of said connecting members and being stabilized with regard to the accuracy of its inclination in a direction parallel to said optical axis.

3. An assembly according to claim 1 or 2 wherein said lens mounting member and said stationary lens barrel are arranged with a space therebetween, said lens mounting member being fixed to said intermediate member through said connecting members by said engaging portion of said connecting members, with said space being maintained by increasing the size of said penetration portion and the slidable contact portion in the radial direction to the optical axis so as to be larger than the thicknesses of said stationary lens barrel and said intermediate member.

4. An assembly according to claim 3 wherein said slot provided on said intermediate member comprises an elongated slot for receiving said slidable contact portion in order to permit insertion of said connecting members from a position radially outwardly of said lens system.

5. An assembly according to claim 1 wherein said engaging portion of said connecting members is in abutting engagement with said hole of said lens mounting member in the direction along said optical axis and wherein there is no abutting engagement therebetween in a direction circumferentially around the optical axis.

* * * * *